(12) United States Patent
Nichols

(10) Patent No.: US 10,524,608 B2
(45) Date of Patent: Jan. 7, 2020

(54) BEVERAGE BREWING PROCESS

(71) Applicant: BUNN-O-MATIC CORPORATION, Springfield, IL (US)

(72) Inventor: Melissa Nichols, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 185 days.

(21) Appl. No.: 15/268,303

(22) Filed: Sep. 16, 2016

(65) Prior Publication Data

US 2017/0079465 A1 Mar. 23, 2017

Related U.S. Application Data

(60) Provisional application No. 62/219,921, filed on Sep. 17, 2015.

(51) Int. Cl.
*A47J 31/42* (2006.01)
*A23F 5/26* (2006.01)
*A47J 31/34* (2006.01)
*A47J 31/46* (2006.01)
*A47J 31/00* (2006.01)

(52) U.S. Cl.
CPC .......... *A47J 31/42* (2013.01); *A23F 5/26* (2013.01); *A47J 31/002* (2013.01); *A47J 31/34* (2013.01); *A47J 31/465* (2013.01)

(58) Field of Classification Search
CPC ....... G07F 13/065; A47J 31/40; A47J 31/002; A47J 31/41; A47J 31/3614; A47J 31/54; A47J 31/24; A47J 31/42; A47J 31/34; A47J 31/46; A47J 31/18; A47J 31/3633; A47J 31/402; A47J 31/465; A23F 3/18; A23F 5/262; A23F 5/405
See application file for complete search history.

(56) References Cited

U.S. PATENT DOCUMENTS

| | | | |
|---|---|---|---|
| 4,109,565 | A | 8/1978 | Tucker |
| 5,650,186 | A | 7/1997 | Annoni et al. |
| 7,225,728 | B2 | 6/2007 | Lyall |
| 8,393,975 | B2 | 3/2013 | Widanagamage et al. |
| 8,635,944 | B2 | 1/2014 | Buchholz et al. |
| 8,794,127 | B2 | 8/2014 | Nosler et al. |
| 8,973,435 | B2 | 3/2015 | Preston et al. |
| 2015/0017297 | A1 | 1/2015 | Vastardis et al. |
| 2015/0208851 | A1 | 7/2015 | Grassia |

FOREIGN PATENT DOCUMENTS

EP    0948927    10/1999

*Primary Examiner* — Hong T Yoo
(74) *Attorney, Agent, or Firm* — Barnes & Thornburg LLP

(57) ABSTRACT

A process and apparatus for preparing a brewed beverage including utilizing a predetermined amount of brewed substance and a predetermined amount of water. The process comprises dispensing a first amount of water into a receiving apparatus, wherein the first amount is less than the predetermined amount of water of the brewed beverage. The process further comprises dispensing the predetermined amount of brewed substance into the receiving apparatus. The process further comprises dispensing a second amount of water into the receiving apparatus, wherein the second amount of water is less than the predetermined amount of water of the brewed beverage.

12 Claims, 5 Drawing Sheets

BEVERAGE BREWING PROCESS

CROSS REFERENCE TO RELATED APPLICATIONS

This application claims the benefit of priority under 35 U.S.C. § 119(e) to U.S. Provisional Patent Application No. 62/219,921, filed Sep. 17, 2015. The disclosures set forth in the referenced applications are incorporated herein by reference in their entireties.

BACKGROUND

A variety of brewing or beverage making methods or systems have been developed which utilize methods of distributing water over a brewing substance or combining water or other ingredients with beverage producing ingredients. In some processes, water is controllably dispensed over the brewing substance during the production of a beverage.

In various beverage brewing systems and in particular brewing systems, a charge of brewing substance is used in conjunction with pressurized brewing. Such pressurized brewing is often referred to as "espresso" brewing. Espresso brewing uses a relatively small charge of ground coffee or other brewing substance for use in a confined brewing chamber. The brewing substance is compacted to a desired degree and then infused with pressurized water. Compaction of the brewing substance and infusion with the pressurized brewing water requires a sealed brewing chamber to facilitate proper brewing.

The beverage product produced in an espresso brewing process is referred to as "Espresso." Espresso tends to be a thicker beverage compared to drip-style, French press, cone or other unpressurized brewing processes. Espresso tends to have a higher percentage of solubles and particulate matter and tends to be relatively viscous or "syrupy."

An alternative beverage product, such as a diluted-brewed beverage or an "Americano" may be produced in conjunction with an espresso brewing process, as well. When producing an Americano-style beverage, for example, Espresso is produced and dispensed into a receiving apparatus, such as a cup, and then additional hot water is dispensed into the receiving apparatus to dilute the Espresso beverage. Thus, Americano beverages are a diluted form of espresso and can be produced by using an espresso brewing machine. Other forms of diluted-brewed beverages may also be similarly produced.

A variety of espresso-brewing machines are available ranging from manual, semi-automatic, to fully automatic. Fully automatic machines may include a control interface which allows a user to select a type of drink, a type of bean, quantity of Espresso/Americano/other diluted-brewed beverage to be produced, and perhaps other characteristics. The fully automatic machine may include bean hoppers which may automatically deliver beans to a grinder and then dispense the ground coffee into a pressurized brewing chamber. Infusion with heated, pressurized water is automatically controlled by the machine after activation by the operator. At the conclusion of the brewing process a puck of spent, drained but moist, brewing substance may be automatically removed from the brewing chamber and transferred to a waste collection container for subsequent removal. For Americano production, heated water is added to the Espresso after the Espresso is dispensed into the receiving apparatus.

SUMMARY

The present disclosure includes an apparatus and process for preparing diluted-brewed beverages in an automatic espresso brewer. The beverage brewing apparatus includes means for dispensing hot water directly into a receiving apparatus both prior to and after an espresso beverage or other brewed beverage is dispensed into the receiving apparatus. The beverage brewing process includes the following: a diluted-brewed beverage (e.g. Americano) is selected by a user; coffee beans are selected based on the user's selection; the coffee beans are ground to a desired consistency in a bean grinder; at or around the time as the beans are ground, a desired amount of hot water is dispensed into the receiving apparatus through a pre-brew dispensing process; hot water is dispensed over the ground coffee in a brew chamber to create a desired amount of espresso or other brewed beverage; the espresso or other brewed beverage is dispensed into the receiving apparatus, while any moistened ground coffee left over after the espresso or brewed beverage is produced is removed for disposal; and a desired amount of additional hot water is dispensed into the receiving apparatus through a post-brew dispensing process.

While the process herein is described with respect to the production of diluted-brewed beverages, the process can be applied to production of various types of beverages that include the introduction of water to a brewed or otherwise substance or where a brewed beverage may be diluted in some manner. In addition, other elements, such as but not limited to introduction of flavoring or syrup, may be included in the process at any time during the steps of the process (such as before, during or after the pre- or post-brew dispensing processes).

DESCRIPTION OF THE DRAWINGS

The organization and manner of the structure and function of the disclosure, together with the further objects and advantages thereof, may be understood by reference to the following description taken in connection with the accompanying drawings, and in which.

DETAILED DESCRIPTION

Figure 1:
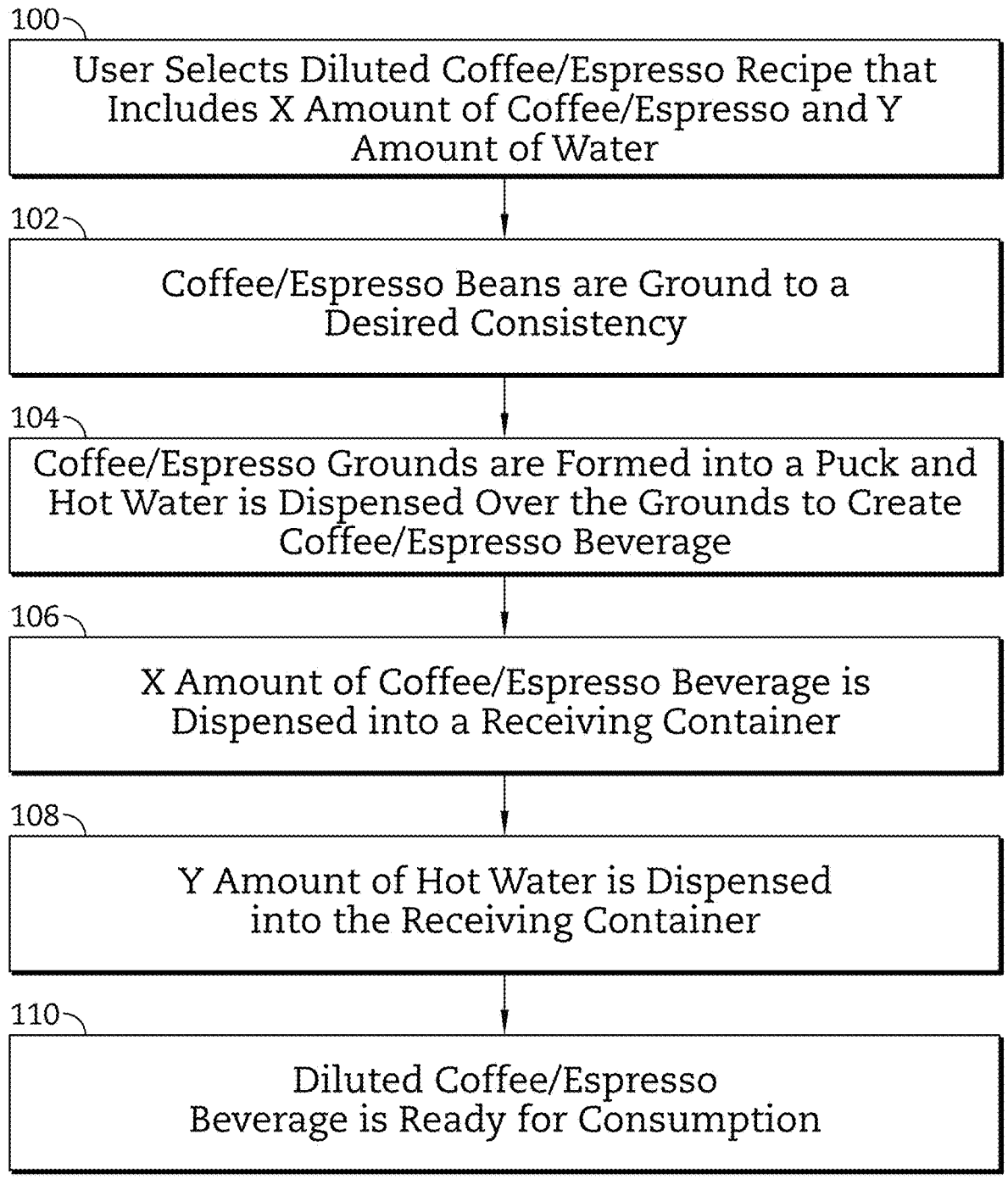
FIG. 1 is a general process-flow schematic of a simplified known brewing process for a diluted-brewed beverage.

While the present disclosure may be susceptible to embodiment in different forms, there is shown in the drawings, and will be described herein in detail, one or more embodiments with the understanding that the present description is to be considered an exemplification of the principles of the disclosure and is not intended to be exhaustive or to limit the disclosure to the details of construction and the arrangements of components set forth in the following description or illustrated in the drawings.

Terms including beverage, beverage making, brewed, brewing, brewing substance, brewed liquid, and brewed beverage as may be used herein are intended to be broadly defined as including, but not limited to, the brewing or making of coffee, tea, herbs, other substances and any other form of beverages or food substances. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified, and will benefit from or find application for the present disclosure. This broad interpretation is also intended to include, but is not limited to beverage substances such as ground coffee, tea, herbs, botanicals, liquid beverage concentrate, powdered beverage concentrate, flaked, granular, freeze dried or other forms of materials including liquid, gel, crystal or other forms of beverage or food materials to obtain a desired beverage or other food product.

While an embodiment of a brewing chamber, such as an extractor, for retaining a quantity of brewing substance is described herein, it is contemplated that any form of beverage brewing substance container or configuration such as a pod or cartridge beverage component for containing a brewing substance, may be used. It is further contemplated that the present system could utilize other concentrates such as freeze dried concentrates, gel, liquid, powder or any other form of concentrate which will operate with the disclosed system as well as equivalents thereof and any modifications which might be required to modify the system to be used with such other substances, if necessary.

Figure 3:
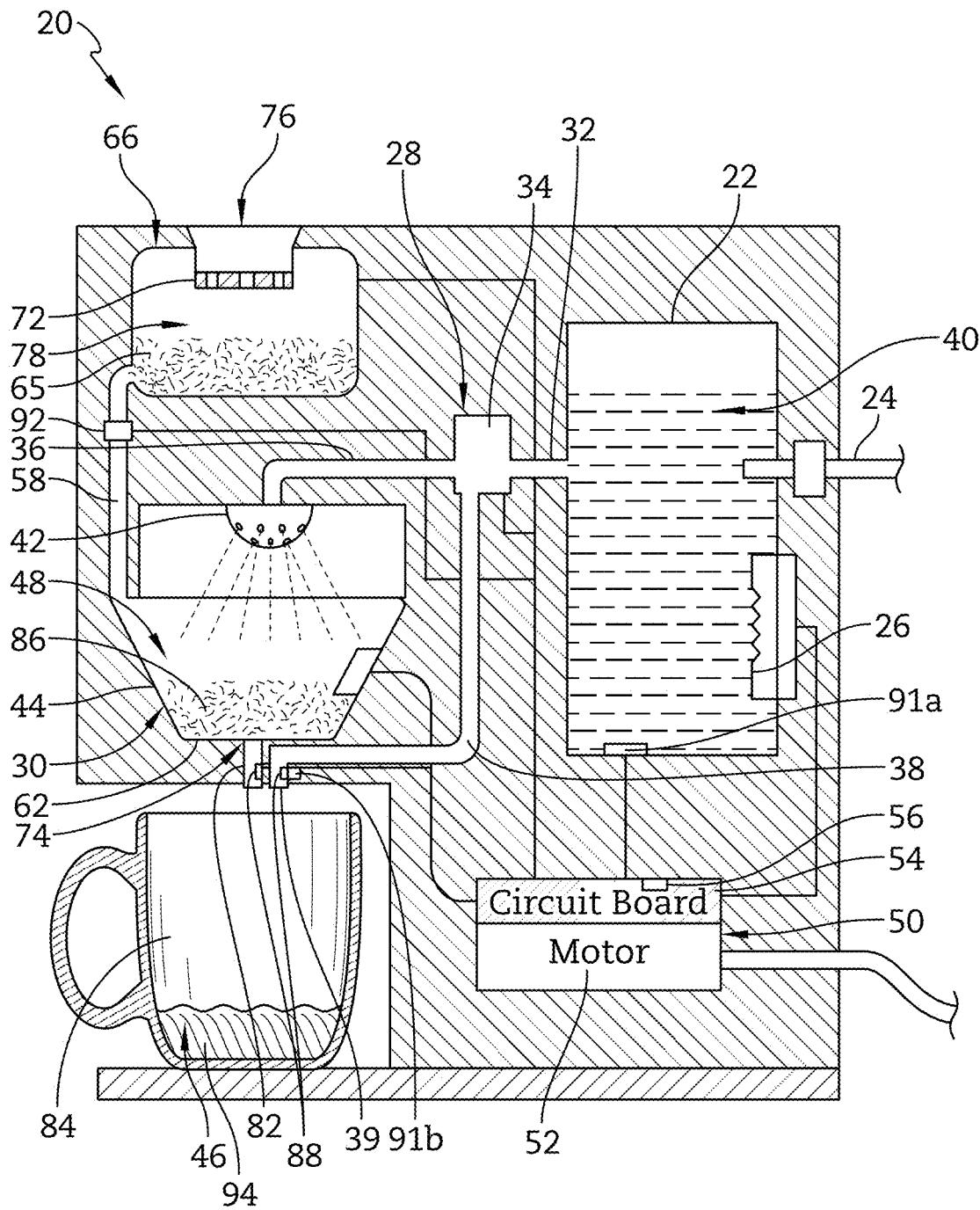
FIG. 3 is an illustrative embodiment of a beverage brewing apparatus of the present disclosure.
Figure 4:
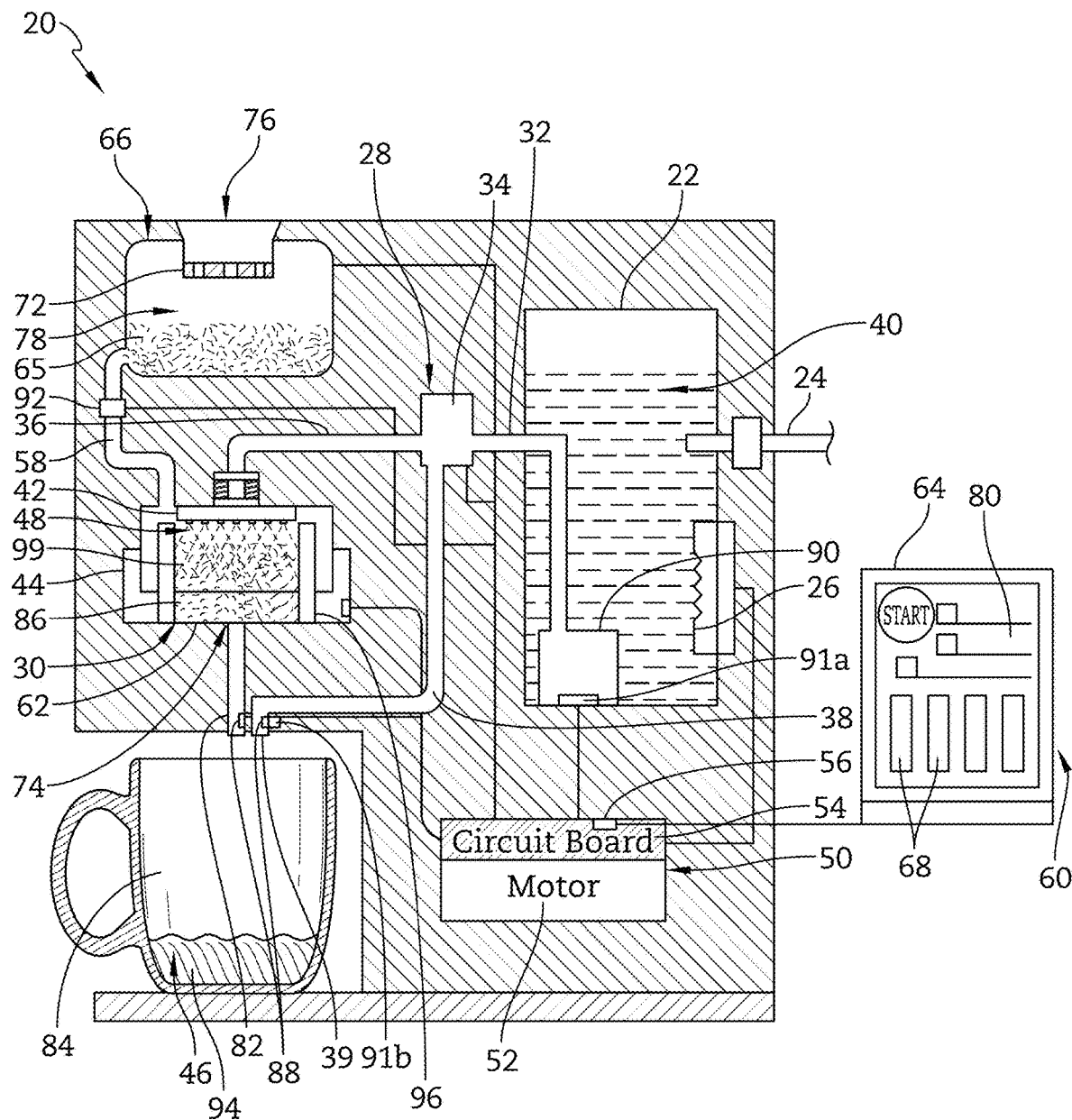
FIG. 4 is an alternative embodiment of a beverage brewing apparatus of the present disclosure.

As shown in FIG. 4, a beverage brewing system 20 is shown in the form of an espresso/diluted-brewed beverage brewing apparatus. While an espresso brewing apparatus is referred to herein, the disclosure is not to be limited to an espresso/diluted-brewed beverage apparatus and may include other methods of preparing brewed beverages, as shown, for example, in FIG. 3. In various embodiments, the process may include preparation of a diluted-brewed beverage such as an Americano, although other forms of beverage are envisioned herein. As noted in this disclosure, the definition of the beverage system is to be expansively interpreted to include an espresso/diluted-brewed beverage brewing apparatus and all other forms of apparatus for producing beverages whether through concentrated or unconcentrated substances. While an espresso brewer is disclosed as an embodiment and described herein, it is envisioned that this system may be used with a single cup or pod-type brewer, a prepackaged cartridge such as a "K-cup" or dose brewer, a coffee brewer, as well as any number of other beverage dispensing machines which might combine ingredients loose or contained, prepackaged or user prepared, concentrated or unconcentrated, and water or other beverage making substance to produce a desired beverage. The present disclosure should not be limited to the specific type of beverage brewing system 20 illustrated, nor should it be limited to the type of beverage produced. In addition, the brewing process and the beverage brewing system 20 for this process may include additional features such as an air infusion (or infusion with other gaseous substances) feature to create turbulence or infusion into the beverage being brewed. The infusion process may be configured to create bubbles in the beverage when the brew chamber is closed, for example. Further, the beverage may be prepared using different amounts of pressure when compressing/compacting the brewing substance. A specific pressure profile may be created to enhance flavor characteristics.

As illustrated in FIG. 1, a prior art brewing process includes various steps to be performed by a user and/or brewing apparatus. A first step 100 involves a user selecting the beverage to be brewed, in this case a beverage that is represented by a recipe for a diluted-brewed beverage, where the recipe is predetermined to include X amount of a selected coffee/espresso beverage and Y amount of water to be added to the selected coffee/espresso beverage to form the selected Americano beverage. In a second step 102, coffee/espresso beans associated with the selected coffee/espresso beverage are ground to a predetermined or desired consistency for brewing. In a third step 104, the ground coffee/espresso beans are formed into a puck of compact ground coffee/espresso beans, and hot water is thereafter dispensed over the puck, infusing the hot water with desired characteristics or components of the ground coffee/espresso beans to produce the coffee/espresso. When a desired amount X of coffee/espresso is prepared in order to prepare the selected recipe, it is dispensed into a receiving container in a fourth step 106. Thereafter, Y amount of hot water is dispensed into the receiving container to mix with the X amount of coffee/espresso in a fifth step 108, thereby creating the selected Americano beverage for the user to consume as illustrated in a sixth step 110.

Figure 2:
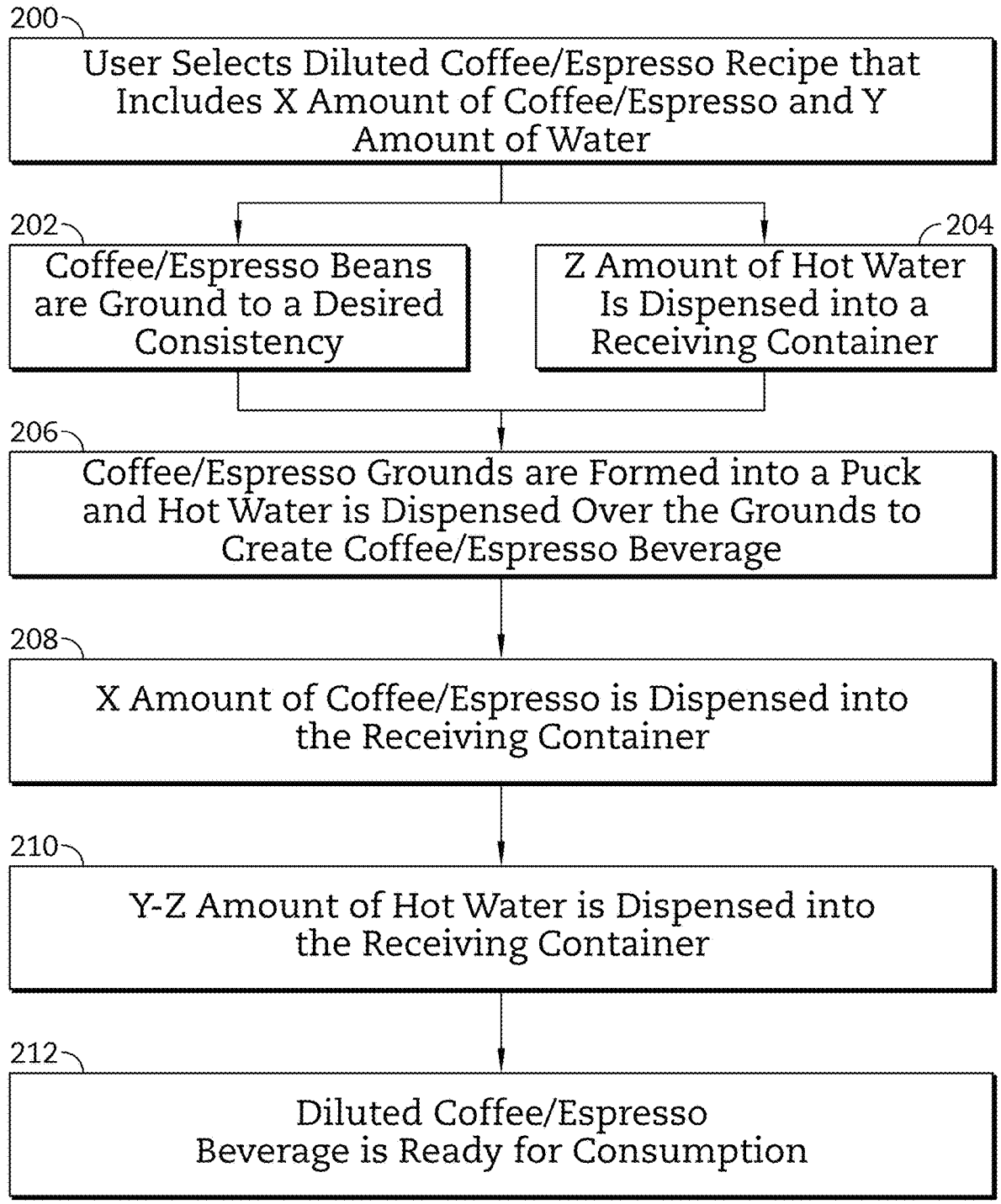
FIG. 2 is a general process-flow schematic of the brewing process for a diluted-brewed beverage of the present disclosure.

In the present disclosure, a diluted-brewed beverage brewing process includes the following steps, as illustrated, for example, in FIG. 2: A user first selects the beverage to be brewed, in this case a beverage that is represented by a recipe for a diluted-brewed beverage (such as an Americano beverage) that is predetermined to include X amount of a selected coffee/espresso beverage and Y amount of water to be added to the selected coffee/espresso beverage, to form the selected diluted-brewed beverage in a first step 200. After the user selects the beverage recipe, the brewing apparatus grinds coffee/espresso beans associated with the selected coffee/espresso beverage to predetermined or desired consistency for brewing in a step 202. At any point before the coffee/espresso is dispensed into a receiving container, a predetermined amount Z of hot water is dispensed into a receiving container before the coffee/espresso in a pre-brew step 204. As illustrated in FIG. 2, an embodiment of this process includes dispensing the amount Z of hot water into a receiving container substantially concurrently with the grinding step 202. The amount Z of hot water can be equal to or less than the amount Y of hot water of the Americano beverage recipe. In another step 206, the ground coffee/espresso beans are formed into a puck of compact ground coffee/espresso beans, and hot water is thereafter dispensed over the puck, infusing the hot water with desired characteristics or components of the ground coffee/espresso beans to produce the coffee/espresso. When a desired amount X of coffee/espresso is prepared in order to prepare the selected recipe, it is dispensed into the receiving container in a step 208. As the pre-brew step 204 caused hot water to be dispensed into the receiving container before the coffee/espresso is dispensed, the dispensing container may generally be in a heated state before the coffee/espresso is dispensed into it. Thereafter, an additional amount of hot water needed for the predetermined beverage recipe, which will be the amount Y-Z, is dispensed into the receiving container to mix with the X amount of coffee/espresso in a post-brew step 210, thereby creating the selected beverage for the user to consume as illustrated in step 212. In illustrative embodiments, the pre-brew step 204 and the post-brew step 210 may dispense the hot water in a continuous stream or pulse the hot water to modify the flavor profile of the recipe, depending on the taste or flavor profile desired.

The brewing process described above is an illustrative embodiment of the process utilizing three steps (pre-brew hot water dispensing, dispensing of coffee, and post-brew dispensing), and the present disclosure should not be limited to only this embodiment. For example, the process may include multiple segments where any number of cycles of dispensing hot water or coffee/espresso are utilized in any order. For instance, the process may include a pre-brew dispensing of hot water, a first dispensing of coffee, an intermediate dispensing of hot water, a second dispensing of coffee, and a postObrew dispensing of hot water. Other processes that include more cycles are also envisioned herein.

In various embodiments, the brewing process of the present disclosure may provide enhance flavor qualities over a traditional process of preparing a diluted-brewed beverage (e.g. Americano).

Illustrative embodiments of the beverage system 20 will now be discussed. In illustrative embodiments, the beverage system 20 of the present disclosure may include a coffee grinder 66, as illustrated in FIGS. 3 and 4. The coffee grinder 66 includes, for example, a receiving port 76 for receiving coffee beans to be ground, a grinding mechanism 72 that grinds the coffee beans a desired amount, and a ground coffee container 78 to hold grounds 86 of coffee for future brewing. The coffee beans may be ground to a preselected or predetermined weight, size or consistency. In alternative embodiments, the user may be able to control the speed and duration of the grinding mechanism 72 by a controller 54, discussed below.

By way of illustration but not limitation, the beverage system 20 may include a beverage brewing chamber 30. The brewing chamber 30 receives coffee or espresso grounds 65 from the grinder 66 by way of a grounds distribution path 58. In order to dispense the appropriate amount of grounds 86 for the desired beverage to be brewed in the brewing chamber 30, a metering valve 92 may be positioned along the distribution path 58. The present disclosure is not limited to the location of such metering device 92, and other locations of a metering valve 92 are also envisioned, such as within the beverage brewing chamber 30 or the ground coffee container 78 of the coffee grinder 66.

In illustrative embodiments, the brewing chamber 30 is configured to receive the grounds 86 and permit brewing of the grounds 86 to form liquid coffee or espresso 94. The brewing chamber 30 may be shaped as known in the art, such as a funnel or other similar design, that includes an annular wall 44 for retaining the grounds 86, as illustrated in FIG. 3. An opening 48 exists at the top of the brewing chamber 30 to receive ground 86 and water from the water delivery system 28, as discussed below. A bottom wall 62 of the brewing chamber 30 extends between the annular wall 44 to enclose the brewing chamber 30 on the bottom. In illustrative embodiments, a drainage hole 74 extends through the bottom wall 62 of the brewing chamber 30 to permit drainage of the brewed beverage after brewing has occurred. The drainage hole 74 may be connected to a dispensing line 82 to dispense the brewed beverage into a receiving apparatus 84. In illustrative embodiments, the dispensing line 82 may include a metering valve 88 to control the flow of the brewed beverage into the receiving apparatus 84.

In an illustrative embodiment, the brewing chamber 30 may comprise an espresso head 96, as illustrated in FIG. 4. The espresso head may be configured to receive the ground 86 as previously described from the grounds distribution path 58. When an appropriate amount of grounds have been received in the espresso head 96, a piston 98 may compress the grounds 86 into a compact disc or puck 99. In illustrative embodiments, the piston 98 may be integrally formed as part of the water delivery system 28, as described below. Other embodiments of using a piston to compress grounds 86 are well known in the art and encompassed herein. In addition, in illustrative embodiments, the piston 98 may compress the grounds 86 before or during delivery of water through the water delivery system 28. After the water has been delivered over the puck 99 of grounds 86 and the resulting brewed beverage dispensed into the receiving apparatus 84, the puck 99 may be removed from the system and disposed before another use of the beverage brewing system 20. Additional methods of preparing a brewed beverage are well known in the art.

By way of illustration but not limitation, the beverage system 20 may include a heated water reservoir 22 of generally known construction, as illustrated in FIGS. 3-4. As shown in the present embodiment, the heated water reservoir 22 may include an inlet line 24 which is connected to a pressurized inlet water line (not shown), a tank 40 to retain the water, and a heating device 26. The use of the pressurized water line 24, tank 40, and heating device 26 is not to be limited and is to be expansively interpreted. Any form of heating device 26 may be applicable to the present disclosure as well as alternatives to the inlet water line 24. For example, the inlet water line 24 may be in the form of a pour-over type of water supply in which water is manually added to the tank 40 or a pressurized system in which water is driven into the tank 40 under pressure.

In general and in illustrative embodiments, the brewing system 20 includes a water delivery system 28 that facilitates controlled movement of water from the heated water reservoir 22. In the embodiment as shown in FIG. 3, the water delivery system 28 includes a controllable valve 34. The controllable valve 34 may be, in an illustrative embodiment, a 3-way valve that is coupled to a first dispensing line 36, a second dispensing line 38, and the reservoir 22. In illustrative embodiments, the reservoir 22 may be coupled to the controllable valve 34 via a connection line 32 coupled to the tank 40, as illustrated in FIGS. 3-4. In illustrative embodiments, the controllable valve 34 permits controlled flow of water through the first dispensing line 36, the second dispensing line 38, or the first and second dispensing lines 36 and 38 together. Various forms of controllable valves 34 are well known in the art, including a gear pump, piston pump, bellows pump, wave pump, peristaltic pump, or any other driving device which is capable of moving water from the reservoir 22 to the spray head 42.

In illustrative embodiments and as illustrated in FIG. 3, on the downstream side of the controllable valve 34, the first dispensing line 36 is coupled to a water distribution head or spray head 42. The spray head 42 delivers water, such as pressurized hot water, to the beverage brewing chamber 30. The second dispensing line 38 may be connected to an outlet port 39 to dispense water into the receiving apparatus 84. In illustrative embodiments, the second dispensing line 38 may include a metering valve 88 to control the flow of the hot water into the receiving apparatus 84.

Arrangements for dispensing other than those illustrated in FIGS. 3-4 are also envisioned herein. For example, water may be dispensed into the brew chamber 30 via a water inlet at the bottom of the brew chamber 30, and brewed substance may exit at the top of the brew chamber 30. There may further be additional inlet(s) into the brew chamber which may facilitate means for introducing air or other gaseous substances for infusion or to create turbulence within the brew substance to enhance the flavor profile of the brewed substance. Further, means to create specific water pressure (either continuously or at a specific pressure profile) to enhance flavor profile as well.

The beverage system 20 includes a control assembly 50 which includes a controller 54 and a control mechanism 56. The controller 54 is coupled to the various components of the brewing system including, but not limited to, the control valve 34, the metering valve 88, the heating device 26, as well as the control mechanism 56. The controller 54 may be embodied by means of a computer as well as specialized circuitry or chips to perform desired functions. The controller 54 may also be coupled to a motor 52 or other similar device that provide power to various components of the beverage brewing system 20, such as the controller 54, the heating device 26, or the grinding mechanism 72 as described above.

In illustrative embodiments, one or more sensors 91 may be coupled to various components of the beverage brewing apparatus to track or measure the current characteristics of the beverage brewing system and providing such characteristics to the circuit board or user. For instance, as illustrated in FIGS. 3 and 4, as sensor 91a may be coupled to the heated water reservoir 22 to determine the amount of water located in the reservoir tank 40. As another example, a sensor 91b may be located adjacent the outlet port 39 of the second dispensing line 38 to determine when hot water is being dispensed or has stopped being dispensed in the receiving apparatus 84. Other means of sensing and tracking the characteristics of various components in the beverage brewing system 20 are generally known in the art.

For purposes of illustration, the controller 54 is coupled to the control mechanism 56 to facilitate control of the brewing system 20 by the user. As will be described in greater detail herein, the control mechanism may include, but is not limited to, a control interface 60. The control interface 60 allows the user to control the strength of the beverage 46 produced by the brewing system. By way of illustration, but not limitation, if the brewing system 20 is configured to brew a diluted-brewed beverage, such as an Americano beverage, the user can control, by means of the control interface 60, the amount of hot water included in the beverage, and thereby the strength of the beverage, produced by the beverage system 20. For example, if the user desires to increase the strength of the coffee, they can use the control interface 60 to increase the strength. Similarly, they can decrease the strength of the coffee using the control interface 60. In illustrative embodiments for the diluted-brewed beverage process of the present disclosure, the user can use the control interface 60 to control the amount of water added both during the pre-brew and post-brew operations described herein. The use of the control interface 60 is to be expansively interpreted to control any type of beverage, for example, the strength or concentration of a carbonated beverage, juice, sport drink, tea or any combination could be controlled by the interface 60.

The term strength is referred to but is intended to be broadly interpreted. The term strength is intended to encompass the flavor or extraction characteristics of the beverage produced by the system. As such, the control interface 60 is intended to allow a user to control the characteristics of the flavor of the beverage produced. For example, the control interface 60 may include a strength controller (not pictured) that allows the user to control the amount of water dispensed, the water pulsing patterns and timing and the type of pulsing to be used in a particular brewing routine. The system 20 allows a user to select the desired result by operating a convenient control interface 60 without having to manipulate a variety of settings to control programmed characteristics of the operation of the brewing system 20 to produce a beverage having selected characteristics as defined by the operation of the brewing system 20.

In the embodiment shown in FIG. 4, the control interface 60 may include a display such as an LED, LCD, intensity changing light, audio, other display 64 and manually controllable indicia or icons 68, user gesture recognition features, or network connectivity (e.g. wife or cell phone) features. The use of the control interface 60 is intended to be broadly interpreted to include any form of interface which will facilitate ease of use by the user. The control interface 60 may include a touch panel screen 80 by which a user may touch the screen with their finger (not shown) and raise or lower indicia 68 on the screen 80 to increase or decrease the strength, or change the extraction characteristics of the beverage.

In use, the controller 54 is generally preprogrammed with various settings corresponding to the characteristics of the brew system. The settings may include, but are not limited to, the volume of water which is dispensed during each brew cycle, the length of time during which water is not dispensed between neighboring pulse brew periods, the length of time for an initial on-time, often referred to as a pre-wet time, and the total period of time for dispensing a given volume of water. The settings may also include selected off-time and on-time patters, the volume of water flowing during a pulse routine, and the flow rate during a dispensing cycle. Any number of configurations of the pulse brewing routine can be preprogrammed into the controller based on any number of considerations including regional preferences, types and quantities of coffee to be used with the system as well as other criteria.

It should be noted that the control mechanism 56 may also include other settings which are independently controlled or controlled in conjunction with the control interface 60. These settings are generally of known construction such as a "16 ounces," "8 ounces," "single cup," etc. Other setting examples may exist for larger quantities. For example, if a user wishes to use the brewing system 20 to produce a half batch or half pot of coffee, a "half pot" setting could be selected. These types of settings are used in prior art machines so as to facilitate ease of use of the brewer. The control mechanism 56 may also include machine intelligence with sensors to measure the brewed substance at the dispensing outlet and user measurements to optimize or change a recipe's settings automatically.

With reference to FIG. 4, another embodiment of the brewing system 20 is shown. In this embodiment, various components are similar or identical to those as shown in FIG. 4. However, as discussed above, FIG. 4 is directed to a diluted-brewed beverage (such as an Americano/espresso) brewing system 20 that utilizes a pressurized brewing chamber 30. Further, in FIG. 4, a pump system 90 may be used to move water from the reservoir 22a to the water spray head 42. Additionally, modifications may be required to the water reservoir 22a to accommodate increased pressures which may be associated with this type of brewer embodiment.

As illustrated in FIG. 3, in a brewing system 20, the brewer may include a substance container 30 such as a brewing funnel for retaining brewed beverages in a drip coffee maker. Additionally, the system may be configured to accommodate the above-noted funnel, a single cup or "pod"

retaining device or an espresso head. The use of these different brewing configurations and the ability to select these configurations from the control mechanism 56 is included in this disclosure.

EXAMPLES

Examples of an illustrative brewing process as disclosed herein will now be described. The present disclosure, however, is not limited to these examples and other variations are envisioned herein.

Figure 5:
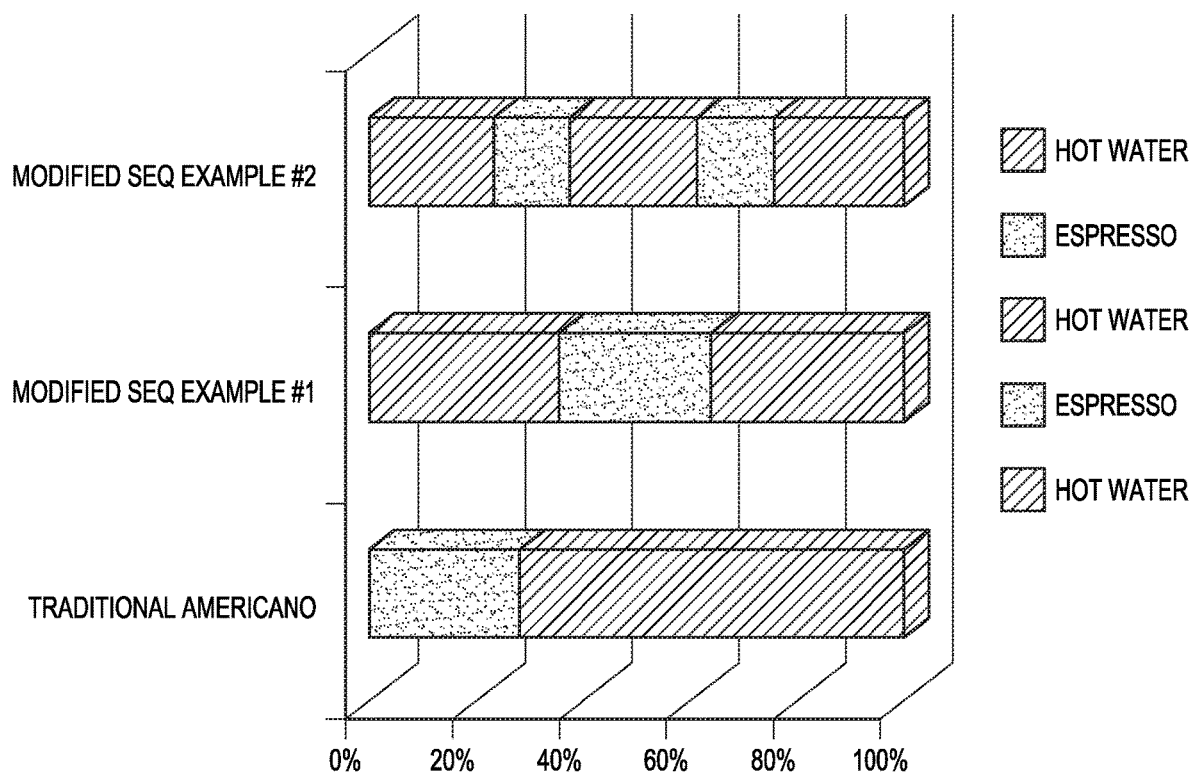
FIG. 5 is a graphical representation of an exemplary recipe for preparation of a diluted-brewed beverage according to the present disclosure.

Chart 1 below and FIG. 5 illustrate an exemplary recipe make-up (in volume and total percentage of beverage substance) for preparation of a diluted-brewed beverage, an Americano beverage, for (i) a traditional production process, (ii) a first modified process in accordance with the present disclosure, and (ii) a second modified process in accordance with the presence disclosure. The first modified process ("Modified Seq. Example #1") is a three-step process including a hot water pre-brew dispensing step, a coffee/espresso dispensing step, and a hot water post-brew dispensing step. The second modified process ("Modified Seq. Example #2") is a five-step process that includes a pre-brew hot water dispensing step, a first coffee/espresso dispensing step, an intermediate hot water dispensing step, a second coffee/espresso dispensing step, and a post-brew hot water dispensing step.

CHART 1

Recipe make up

| | Volume in ml | | | | |
|---|---|---|---|---|---|
| | Hot water | Espresso | Hot water | Espresso | Hot water |
| Traditional Americano | 0 | 60 | 150 | 0 | 0 |
| Modified Seq Example #1 | 75 | 60 | 75 | 0 | 0 |
| Modified Seq Example #2 | 50 | 30 | 50 | 30 | 50 |

The brewing processes noted above may be configured to provide additional benefits to the final beverage. For instance, taste/flavor profile and/or temperature profile of the beverage may be enhanced. As an illustrative embodiment, Chart 2 below illustrates temperature testing data, comparing temperature testing of the traditional Americano brew process with temperature testing of the Modified Seq. Example #1 above.

CHART 2

| | Traditional Espresso | | | Modified Brew sequence Example #1 | |
|---|---|---|---|---|---|
| | Cup Temp (° F.) | Heat Time (sec) | | Cup Temp (° F.) | Heat Time (sec) |
| 1 | 173.1 | 21.63 | 1 | 180.7 | 9.95 |
| 2 | 175.6 | 42.5 | 2 | 177.6 | 10.16 |
| 3 | 176.8 | 27.31 | 3 | 174.4 | 10.01 |
| 4 | 174.3 | 40.75 | 4 | 178.1 | 9.86 |
| 5 | 176.9 | 21.4 | 5 | 175.7 | 10.03 |
| Averages | 175.34 | 30.718 | Averages | 177.3 | 10.002 |

In illustrative embodiments, the brewing process for a diluted-brewed beverage under Modified Seq. Example #1 may begin by a user depositing an appropriate amount and type of coffee beans into the receiving port 76 of the grinder 66. Once the user has selected the type of brew, if necessary, for the desired beverage, the user may then operate the control interface 60 to increase or decrease the strength of the coffee produced. Once set, the brewing system 20 will grind the appropriate amount of coffee beans and dispense those grinds into the brewing chamber 30, where water will be introduced to the grounds to brew a coffee or espresso beverage. The brewing system 20 will also dispense a pre-determined amount of pre-brew water (e.g. 75 ml) into the receiving apparatus prior to or in conjunction with the brewing of the coffee or espresso beverage. The brewing system 20 will then dispense the brewed coffee or espresso (e.g. 60 ml) beverage into the receiving apparatus, where it will mix with the pre-brew water already in the receiving apparatus. Then, an additional post-brew water is dispensed into the receiving apparatus (e.g. 75 ml) where it will mix with the brewed coffee or espresso beverage and the pre-brew water already dispensed into the receiving apparatus. The diluted-brewed beverage is then ready for consumption by the user in accordance with the user's chosen beverage characteristics.

The brewing process described herein includes preparing a brewed beverage that includes a predetermined amount of brewed substance and a predetermined total amount of water. The process includes dispensing a first dilution amount of the total amount of water into a receiving apparatus, the first dilution amount being less than the predetermined total amount of water of the brewed beverage. The process further includes dispensing a predetermined amount of brewing substance into a brewing chamber. The process further includes dispensing a brewing amount of the total amount of water into the brewing chamber and then combining the brewing amount with the brewing substance to form a brewed beverage in the brewing chamber. The process then includes dispensing the brewed beverage into the receiving apparatus. Finally, the process includes dispensing a second dilution amount of water into the receiving apparatus, wherein the second amount of water is less than the predetermined total amount of water of the brewed beverage and is the remaining amount of the total amount of water after using the first dilution amount and the brewing amount. The various steps noted may occur in a different order, depending on the particular beverage selected and the process of making that beverage. For instance, if coffee media (e.g. coffee beans) need to be ground, the step of dispensing the first dilution amount may occur at the same time as grinding the coffee media and before the media is dispensed into the brewing chamber. Alternatively, the step of dispensing the first dilution amount may occur after the brewing substance and the brewing amount of water is dispensed into the brewing chamber. Alternative orders of the steps of the brewing process described herein are envisioned within the scope of this disclosure.

While the brewing process is described in detail regarding Modified Seq. Example #1 above, it is understood that the process may be modified (e.g. as described in Modified Seq. Example #2) within the scope of this disclosure. Other forms of modification are also envisioned herein.

In various embodiments, additional features may be included in the brewing process and/or the brewing system 20 that are configured to enhance the quality of beverage produced.

A first additional feature that may be included is means to modify the amount of pressure or force being applied to the ground coffee/beverage substance during brewing. In traditional espresso brewing, ground coffee is compacted to a high pressure (e.g. 50 lbs of force) as it is held between two pistons prior to having the hot water flow through the coffee grounds. The high water pressure used in the traditional espresso brewing process, and the small particle size of the espresso coffee grounds, allows accelerated interaction between the coffee grounds and the water for quick extraction of the brewed solution. This configuration permits espresso drinks to achieve high solids and brewed substance in a syrupy nature along with crème. However, there are other styles of coffee beverage like, the drip style coffee, where there is a need for a more gentle interaction of coffee and water to prevent extraction of undesired elements (e.g. bitters) from the coffee grounds. When utilizing an espresso machine to achieve quality drip-style type beverages, the espresso machine could be modified such that the piston location in the brew chamber is modified to create room above the coffee grounds and facilitate a more gentle interaction of coffee grounds with the hot water. For instance, after compacting the coffee grounds (e.g. with 50 lbs of force), the fore applied to the coffee grounds could be decreased or eliminated, creating some space around the compacted coffee ground substance for water to flow around it in a more gentle manner. The piston(s) may be locked in a predetermined position to permit this space for a gentler flow of water around the coffee substance. The amount of space provided could be predetermined by, for instance, the size of the coffee grounds or the volume of the beverage being produced. This may be performed with or without pre-infusion of hot water (short dispensing of hot water to allow blooming of coffee grounds) along with variable dwell times. While espresso brewing is used as an example to explain this method, other brewing processes are also envisioned herein.

Another additional feature that may be included is means for varying the water pump pressure, or means for varying/setting the pressure profile during brewing. Water pressure during brewing affects the interaction of the coffee particles with water and dictates the duration of the brew to achieve a desired taste profile of the brewed substance. For example in traditional espresso brewing, predetermined water pressure (e.g. 9 bar water pressure) may be recommended for proper extraction of compacted espresso coffee grounds held in a chamber. When utilizing an espresso machine, a lower water pressure, or a pulsating hot water stream following a pre-determined pressure profile, could be applied to achieve end-cup quality of other beverages like drip style coffee or diluted-brewed beverages. Lowering the pressure or following a pressure profile could minimize the creme in the brewed substance, which may be undesired in beverages like drip style coffee. The variable pressure profile for the hot water used for brewing can be predetermined to use as settings in a recipe or create machine intelligence to automatically develop pressure profile based on the end-cup taste requirements requested by the user.

Other additional features that may be included in the brewing process include variations in the particle size of the coffee grounds used, and variation in the temperature of the brew water. As the size of the coffee grounds and the temperature play a critical role in the brew process and in determining the cup quality, these features can be modified or adjusted to achieve a desired quality or flavor profile of the beverage. As an example, when using an espresso machine to prepare drip-style or diluted-brewed beverages, the temperature could be set around 200 degrees F. to improve the taste profile. If the hot water tank of a traditional espresso machine is held at a lower temperature (say 195 degrees F.), then the water in the tank could be adjusted upward when needed. As another example, the particle size of the ground coffee could be consistent or the ground coffee substance could contain particles of different sizes (e.g. bimodal or multi modal distribution of coffee particles) that can be used to enhance the taste profile of the brewed substance.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure.

The invention claimed is:

1. An apparatus for forming a brewed beverage and configured to dispense the brewed beverage into a container, the apparatus comprising:
    a brewing chamber configured to retain a coffee media for brewing;
    a control assembly for at least controllably operating components of the apparatus;
    a grinder coupled to the control assembly for controllably grinding a predetermined amount of coffee substance to form the coffee media, and the grinder configured for controllably dispensing the coffee media into the chamber;
    a dispensing line configured to dispense a brewed substance from the brewing chamber into the container; and
    a water delivery system coupled to the control assembly for controllably delivering at least a predetermined first amount of water to the brewing chamber and for separately, controllably delivering a predetermined second amount of water to the container;
    wherein the water delivery system controllably dispenses the first amount of water into the brewing chamber, the grinder controllably dispensing a predetermined amount of coffee media into the chamber at the same time the first amount of water is controllably dispensed into the chamber;
    the dispensing line dispenses a first amount of brewed substance into the container after the first amount of water is dispensed, and the water delivery system controllably dispenses the second amount of water into the container for combination with the first amount of brewed substance dispensed into the container.

2. The apparatus of claim 1, the apparatus further comprising a hot water tank configured to direct hot water to both the brewing chamber and the container.

3. The apparatus of claim 1, the apparatus further comprising a control interface for controlling operation of a controller of the apparatus.

4. The apparatus of claim 1, wherein a user can utilize the control interface to select a desired beverage product to control the first amount of water controllably dispensed into the chamber with the dispensing of the coffee media from the grinder, and the second amount of water controllably dispensed into the container.

5. The apparatus of claim 1, further comprising wherein the water delivery system controllably dispenses a third amount of water into the container after the second amount of brewed substance is controllably dispensed.

6. The apparatus of claim 5, wherein the first amount of water is equal to the second amount of water, and the second amount of water is equal to the third amount of water.

7. The apparatus of claim 6, wherein the sum of the first, second, and third amounts of water equals a predetermined amount of water for a diluted-brewed beverage.

8. The apparatus of claim 1, wherein the sum of the first and second amounts of water equals a predetermined amount of water for a diluted-brewed beverage.

9. The apparatus of claim 1, wherein the water delivery system controllably dispenses the first amount of water while the coffee media is brewing in the brewing chamber.

10. The apparatus of claim 1, wherein the brewing chamber is a closed chamber.

11. The apparatus of claim 1, wherein the brewing chamber includes one or more pistons that are configured to compress the coffee media.

12. The apparatus of claim 11, wherein the water delivery system controllably delivers water to the brewing chamber when the coffee media is compressed.

* * * * *